United States Patent
Kishimoto (10) Patent No.: US 7,869,912 B2
(45) Date of Patent: Jan. 11, 2011

(54) CONTROLLING DEVICE OF HYBRID VEHICLE

(75) Inventor: Youichi Kishimoto, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 971 days.

(21) Appl. No.: 11/686,493

(22) Filed: Mar. 15, 2007

(65) Prior Publication Data

US 2007/0219702 A1  Sep. 20, 2007

(30) Foreign Application Priority Data

Mar. 15, 2006  (JP) .............................. 2006-070521

(51) Int. Cl.
    G05D 11/00  (2006.01)
(52) U.S. Cl. .............................. 701/22; 701/86; 701/68; 701/69; 180/65.21; 180/65.265; 180/65.28; 123/434; 123/436; 123/675; 123/679; 123/681
(58) Field of Classification Search .............. 180/65.21, 180/65.265, 65.28; 123/434, 436, 675, 679, 123/681; 701/22, 69, 86
See application file for complete search history.

(56) References Cited

U.S. PATENT DOCUMENTS

| | | | |
|---|---|---|---|
| 4,216,750 A * | 8/1980 | Kobayashi .................. 123/435 |
| 5,458,102 A | 10/1995 | Tomisawa et al. |
| 5,652,380 A | 7/1997 | Machida |
| 5,722,359 A * | 3/1998 | Chubachi et al. ......... 123/192.2 |
| 5,862,497 A * | 1/1999 | Yano et al. .................... 701/22 |
| 5,867,983 A | 2/1999 | Otani |
| 5,949,146 A * | 9/1999 | VandenBerghe .......... 290/40 R |
| 5,978,719 A * | 11/1999 | Yano et al. .................... 701/22 |
| 6,085,723 A | 7/2000 | Pels et al. |
| 6,390,214 B1 * | 5/2002 | Takahashi et al. ........ 180/65.26 |
| 6,430,483 B2 * | 8/2002 | Takaoka et al. ............... 701/22 |
| 6,570,265 B1 * | 5/2003 | Shiraishi et al. ........... 290/40 C |
| 6,742,487 B2 * | 6/2004 | Yamaguchi et al. ...... 123/179.3 |
| 7,441,617 B2 * | 10/2008 | Nogi et al. ............. 180/65.235 |
| 2003/0144773 A1 * | 7/2003 | Sumitomo .................... 701/22 |
| 2007/0068478 A1 | 3/2007 | Zillmer et al. |

FOREIGN PATENT DOCUMENTS

| | | |
|---|---|---|
| DE | 19709134 A1 | 9/1998 |
| DE | 102004016559 A1 | 10/2005 |
| EP | 0893593 A2 | 1/1999 |
| JP | H06-288276 A | 10/1994 |
| JP | H08-232752 A | 9/1996 |
| JP | H09-126040 A | 5/1997 |
| JP | H11-036922 A | 2/1999 |
| JP | 2001-513978 A | 9/2001 |
| JP | 2004-048866 A | 2/2004 |

* cited by examiner

*Primary Examiner*—Khoi Tran
*Assistant Examiner*—Nikhil Sriraman
(74) *Attorney, Agent, or Firm*—Global IP Counselors, LLP (57) ABSTRACT

This invention relates to a hybrid vehicle controlling device and method of using the device, in which an engine torque proportion (which is transmitted from an engine to a driving shaft) of a total sum of torque transmitted to the driving shaft is calculated. An allowed surge torque value, which is an upper limit of a surge torque allowed to the engine, is set to a larger value as the engine torque proportion is reduced. Then a predetermined parameter of the engine is changed so that the engine is controlled in a range in which the surge torque of the engine does not go beyond the allowed surge torque value.

22 Claims, 8 Drawing Sheets

CONTROLLING DEVICE OF HYBRID VEHICLE

CROSS-REFERENCE TO RELATED APPLICATIONS

This application claims priority under 35 U.S.C. §119 to Japanese Patent Application No. 2006-070521 filed on Mar. 15, 2006. The entire disclosure of Japanese Patent Application No. 2006-070521 is hereby incorporated herein by reference.

BACKGROUND OF THE INVENTION

1. Field of the Invention

The present invention relates to controlling of a hybrid vehicle that has both an engine and a motor as power sources.

2. Description of the Related Art

In hybrid vehicles that comprises both an engine and a motor as power sources, both of which transmit torque to the drive wheels, a controlling operation, for changing a proportion of driving power to be generated by the engine and a proportion of driving power to be generated by the motor in accordance with an operation state such as a heat generation state of the motor, electrical power that can be output by a battery, or vehicle speed, is carried out. Such a device is disclosed in Japanese Unexamined Patent Application Publication No. 2004-48866.

In the hybrid vehicle, the engine and the motor can be operated at efficient operating points, so that, compared to related engine only vehicles, it is fuel-efficient and provides high exhaust performance.

When the engine proportion of torque that is transmitted to a driving shaft is small, that is, when a motor assist amount ratio is large, the influence of a surge torque or output variation (which is generated due to a deterioration in an engine combustion state) on the behavior of the vehicle is reduced. In other words, in this state, even if the exhaust performance is given priority and, for example, a lean air-fuel ratio and retarding of an ignition time for increasing the surge torque are achieved, the behavior of the vehicle is seldom adversely affected.

However, in the related art, even if the influence of the deterioration of the behavior of the vehicle is small, a controlling operation for improving the exhaust performance in accordance with the influence on the behavior of the vehicle has not been carried out.

SUMMARY OF THE INVENTION

Accordingly, it is an object of the present invention to make it possible to reduce vehicle emissions in a hybrid vehicle.

According to the present invention, there is provided a controlling device of a hybrid vehicle. The hybrid vehicle includes both an engine and a motor as power sources; engine and motor torque both being transmittable to a drive shaft. The controlling device comprises a controller that is programmed to continually calculate the engine torque proportion of the total torque. The controller acts to set the allowed surge torque value to a larger value as the engine torque proportion is reduced, so as to control the engine such that the instantaneous surge torque of the engine does not go beyond an allowed surge torque value. It will be understood that the total torque is the sum of the amount of torque of the engine plus the amount of torque of the motor being transmitted to the drive shaft.

According to the present invention, it is possible to perform effective control for improving emissions of the engine while restricting the surge torque of the engine within an allowable range, and to improve vehicle emissions while restricting deterioration in the vehicle behavior caused by the surge torque.

DESCRIPTION OF THE PREFERRED EMBODIMENT

An embodiment of the present invention will hereunder be described with reference to the attached drawings.

Figure 1:
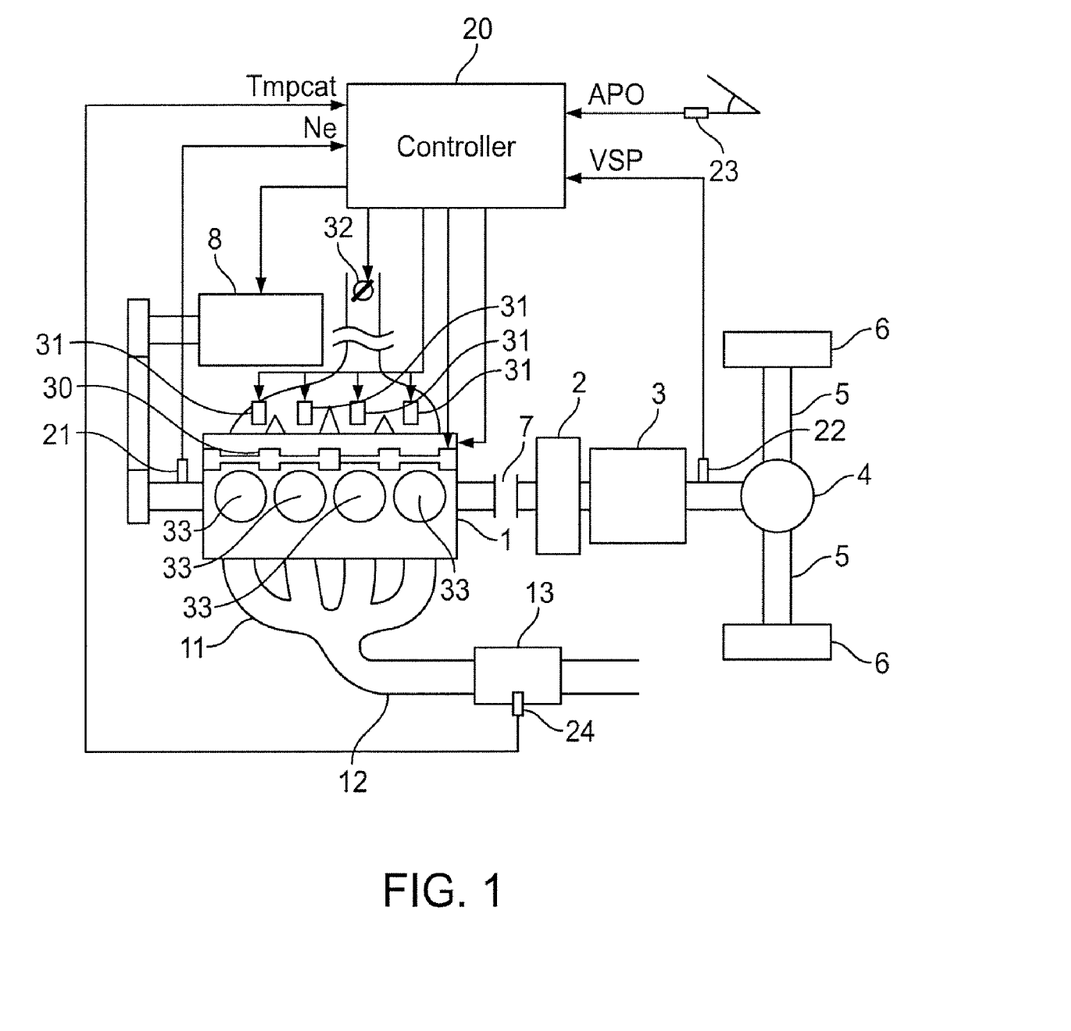
FIG. 1 is a schematic view of a structure of a hybrid vehicle including a controlling device according to an embodiment of the present invention.

FIG. 1 is a schematic view of a structure of a hybrid vehicle including a controlling device 20 according to the present invention. The vehicle includes both an engine 1 and a motor 2 as power sources. Torque of the engine 1 and torque of the motor 2 are transmitted to driving wheels 6 through a transmission 3, a transfer unit 4 (or distributor) that distributes output rotation from the transmission 3 towards the left and right wheels 6, and a driving shaft 5. A clutch 7 is interposed between the engine 1 and the motor 2. It will be understood by persons having ordinary skill in the art that by switching an engagement state of the clutch 7 it is possible to switch between a hybrid travel mode (in which the vehicle travels by the torque of both the engine 1 and the motor 2) and a motor travel mode (in which the vehicle travels solely by the torque of the motor 2). A generator 8, combined with a stator of the engine 1, is connected to a crankshaft of the engine 1 so that the generator 8 can rotate in synchronism with the engine 1.

The engine 1 includes a variable valve timing mechanism 30 that changes valve timing. By providing a lead angle for a period of the opening/closing of an intake valve, it is possible to increase a valve overlap amount with an exhaust valve (a period when both the intake valve and the exhaust valve are open). When the valve overlap amount is increased, a portion of exhaust gas flows into an intake manifold, and is sucked into a combustion chamber at a next intake stroke. Therefore, it is possible to realize exhaust gas recirculation (internal EGR) in the engine.

The exhaust gas of the engine 1 is guided to a catalytic converter 13 through an exhaust manifold 11 and a discharge pipe 12. The catalytic converter 13 is a three-way catalyst. HC, CO, and NOx in the exhaust gas are purified at the catalytic converter 13 and thereafter discharged into the atmosphere.

Detection signals are input to the controller 20 from a crank angle sensor 21, a vehicle speed sensor 22, an accelerator operation amount sensor 23, and a catalyst temperature sensor 24. The crank angle sensor 21 detects a crank angle and a rotational speed Ne of the engine 1. The vehicle speed sensor 22 detects a vehicle speed VSP from the output rotation of the transmission 3. The accelerator operation amount sensor 23 detects an accelerator pedal operation amount APO. The catalyst temperature sensor 24 detects a temperature Tmpcat of the catalytic converter 13. The controller 20 determines a driving state on the basis of the input signals, and controls in an integrative manner the engine 1, the motor 2, the generator 8, and the transmission 3 on the basis of the determined driving state.

During cooling, the controller 20 retards an ignition time of an ignition plug 33 of the engine 1 and increases exhaust temperature, so that a temperature rise of the catalytic converter 13 is accelerated to increase exhaust performance during the cooling. In addition, a lead angle is provided for a period of opening/closing the intake valve to increase the valve overlap amount, so that the internal EGR is increased to accelerate fuel atomization. As a result, the amounts of HC and CO exhausted from the engine 1 are reduced. Further, by controlling fuel injection amounts from a fuel injection valve 31 and a throttle valve 32 for controlling intake, a lean degree of the air-fuel ratio is increased to reduce the amounts of HC and CO exhausted from the engine 1. Still further, even during a time other than the cooling, the controller 20 performs these controlling operates if necessary when it is possible to expect an improvement in the exhaust performance, that is, a reduction in emissions, of the engine 1 by performing these controlling operations.

Here, restriction of surge torque and execution of these controlling operations, that is, improvement of the exhaust performance is in a trade-off relationship. Therefore, to improve the exhaust performance while restricting an allowed surge torque range, a torque proportion Re (that is transmitted from the engine 1 to the driving shaft 5 and hereunder referred to as "engine torque proportion") of a total torque sum (hereunder referred to as "driving shaft transmission torque") that is transmitted from the driving shaft 5 is calculated to calculate the allowed surge torque value of the engine 1 on the basis of the engine torque ratio Re. In addition, in order to prevent the surge torque of the engine 1 from becoming greater than this allowed value, the retard amount (or retard limit) of the ignition time of the engine 1 is increased, the valve overlap amount (or the valve lead angle amount) is increased, and the lean degree of the air-fuel ratio is increased.

Figure 2:
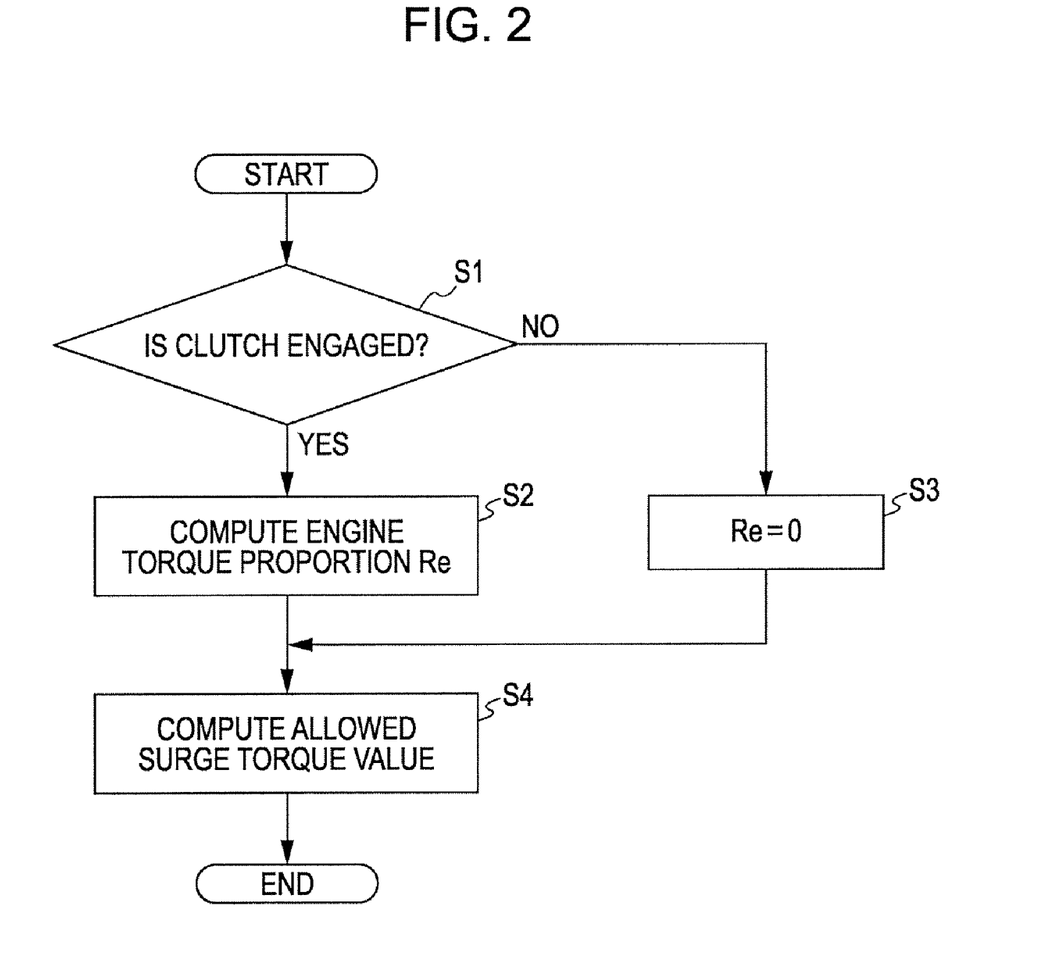
FIG. 2 is a flowchart showing the steps of calculating an allowed surge torque value.

FIG. 2 is a flowchart showing the steps of calculating an allowed surge torque value. The calculation of the allowed surge torque value that is carried out by the controller 20 will be described with reference to FIG. 2. First, in Step S1, a determination is made as to whether or not the clutch 7 is engaged. If it is engaged, the process proceeds to Step S2, and, if it is disengaged, the process proceeds to Step S3.

In Step S2, the engine torque proportion Re of the total-torque sum is calculated from the total sum of the engine torque and the motor torque transmitted to the driving shaft and the torque transmitted to the driving shaft from the engine.

It will be understood that the total torque transmitted to the driving shaft 5 is found using the following equation: Total torque=r·(tTe−tTg+tTm); where target torque of the engine 1 is tTe, a target torque of the motor 2 is tTm, a target torque of the generator 8 is tTg, and a speed-reduction ratio from an input shaft of the transmission 3 to an output shaft of the transfer unit 4 is r (=transmission gear ratio rt of transmission 3×speed-reduction ratio rf of transfer unit 4), since a portion of the torque of the engine 1 is consumed by the generator 8 and transmitted to the driving shaft 5. The portion of the torque of the engine 1 transmitted to the driving shaft 5 is equal to: r·(tTe−tTg).

Therefore, the engine torque proportion Re [%] can be calculated by the following Formula (1):

$$Re=[r\cdot(tTe-tTg)]/[r\cdot(tTe-tTg+tTm)]\times 100=(tTe-tTg)/(tTe-tTg+tTm)\times 100 \qquad (1)$$

Here, although the target torque tTe of the engine 1, the target torque tTm of the motor 2, and the target torque tTg of the generator 8 are used to calculate the engine torque proportion Re, an actual torque Te of the engine 1, an actual torque Tm of the motor 2, and an actual torque Tg of the generator 8 may be used to calculate the engine torque proportion Re.

In Step S3, the engine torque proportion Re is similarly calculated. However, when the process proceeds to Step S3, the clutch 7 is disengaged as mentioned above. Therefore, the torque of the engine 1 is not transmitted to the driving shaft 5; so that the engine torque proportion Re is 0%.

Figure 3:
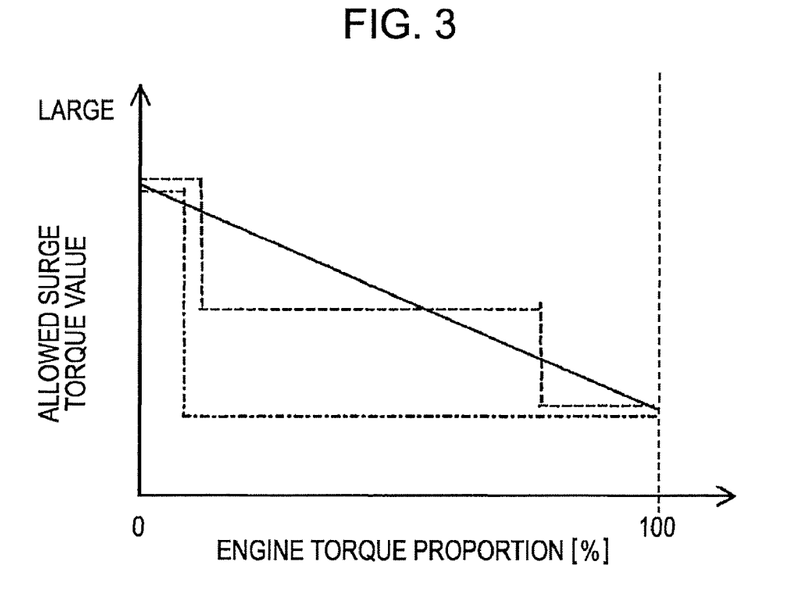
FIG. 3 is a graph showing the relationship between engine torque proportion and allowed surge torque value.

In Step S4, on the basis of the engine torque proportion Re calculated in Step S2 or S3, the allowed surge torque value is calculated with reference to the graph (solid line) shown in FIG. 3. The allowed surge torque value varies proportionally to the engine torque proportion Re. The smaller the engine torque proportion Re, the larger the allowed surge torque value that is set.

Although, here, the graph is set so that the allowed surge torque value based on the engine torque varies proportionally to the engine torque proportion Re, the graph may be set so that the allowed surge torque value varies in steps with respect to the engine torque proportion Re as shown by a broken line shown in FIG. 3, or so that the allowed surge torque value is increased only when the engine torque proportion Re is 0% as shown by an alternate long and short dash line shown in FIG. 3.

Figure 4:
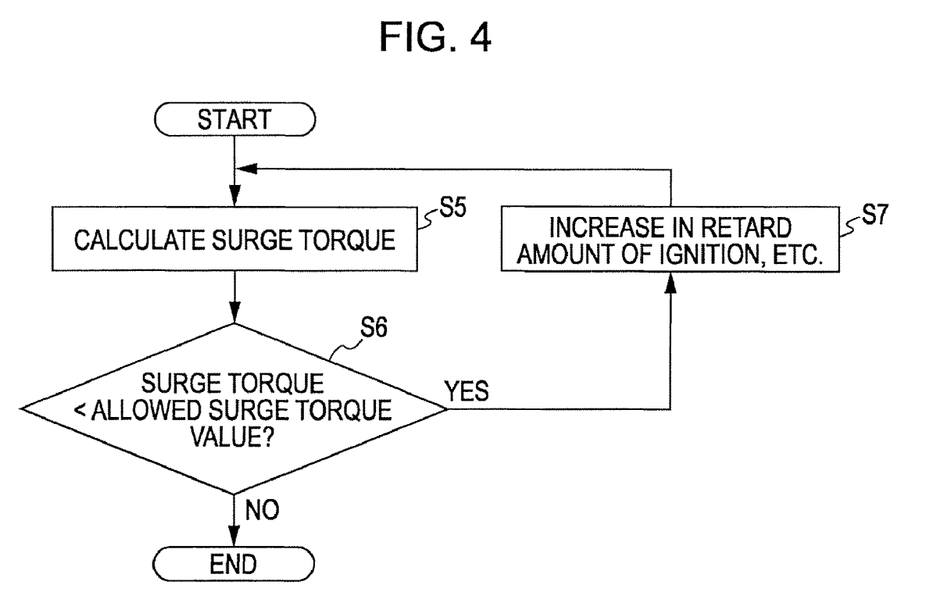
FIG. 4 is a flowchart showing the steps of performing a controlling operation for improving engine emissions.

When the allowed surge torque value is set in this manner, the controller 20 carries out Steps S5 to S7 in accordance with the flowchart shown in FIG. 4. In Step S5, the controller 20 calculates a current surge torque of the engine 1. Then, in Step S6, it compares the current surge torque and the allowed surge torque value with each other. When the current surge torque is less than the allowed surge torque value, in Step S7, the retard amount (or retard limit) of the ignition timing of the engine 1 is increased, the valve overlap amount (or valve lead angle amount) is increased, or the lean degree of the air-fuel ratio is increased. Steps S5 to S7 are repeated until the surge torque of the engine 1 equals the allowed surge torque value, so that the exhaust performance of the engine 1 is maximally increased.

The current surge torque may be determined from the rotation variation of the engine 1 that is determined from a result of detection of the crank angle sensor 21, or from a variation in the internal pressure in a tube of the engine 1, with a separately provided sensor that detects this internal pressure.

It will be understood that the surge torque of the engine 1 cannot be directly detected. It needs to be determined by calculating it from, for example, the rotation variation. Therefore, in the above-described controlling operations, instead of determining the allowed surge torque value, the retard amount (or retard limit) of the ignition timing, the valve overlap amount (or valve lead-angle amount), and the lean degree of the air-fuel ratio, the surge torque may be directly determined from the engine torque proportion Re with reference to the tables shown in FIGS. 5 to 7.

Figure 5:
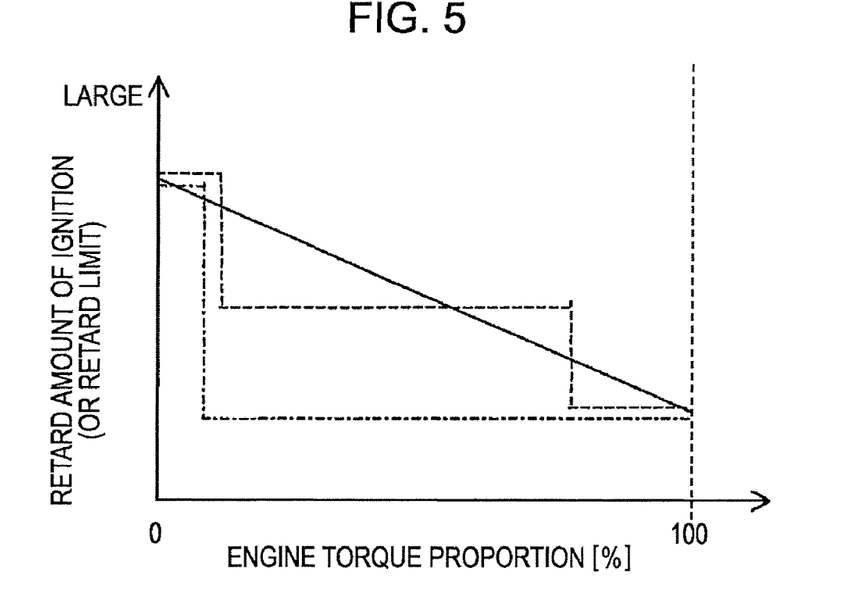
FIG. 5 is a graph showing the relationship between engine torque proportion and retard amount (or retard limit) of an ignition time.
Figure 6:
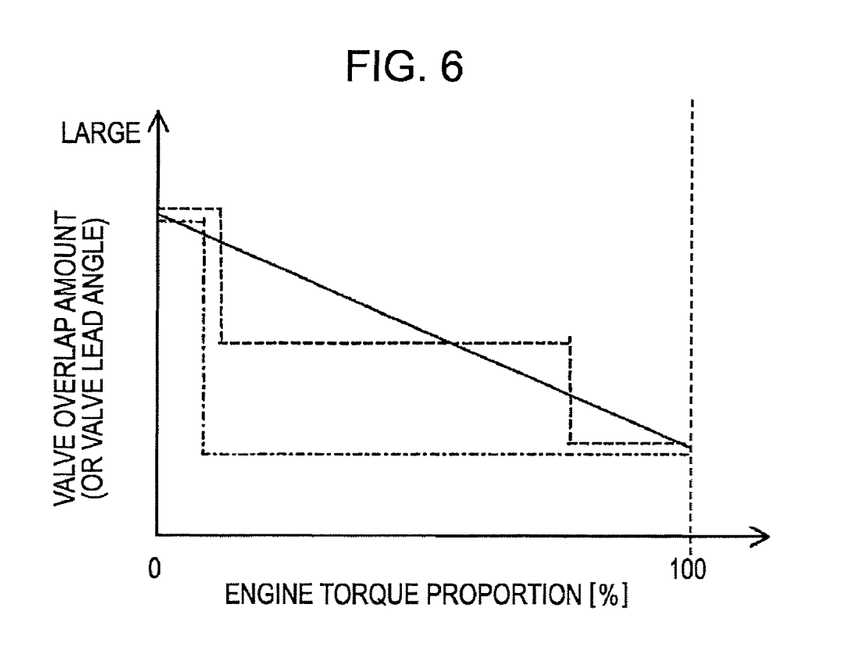
FIG. 6 is a graph showing the relationship between engine torque proportion and valve overlap amount (or lead angle amount of valve)
Figure 7:
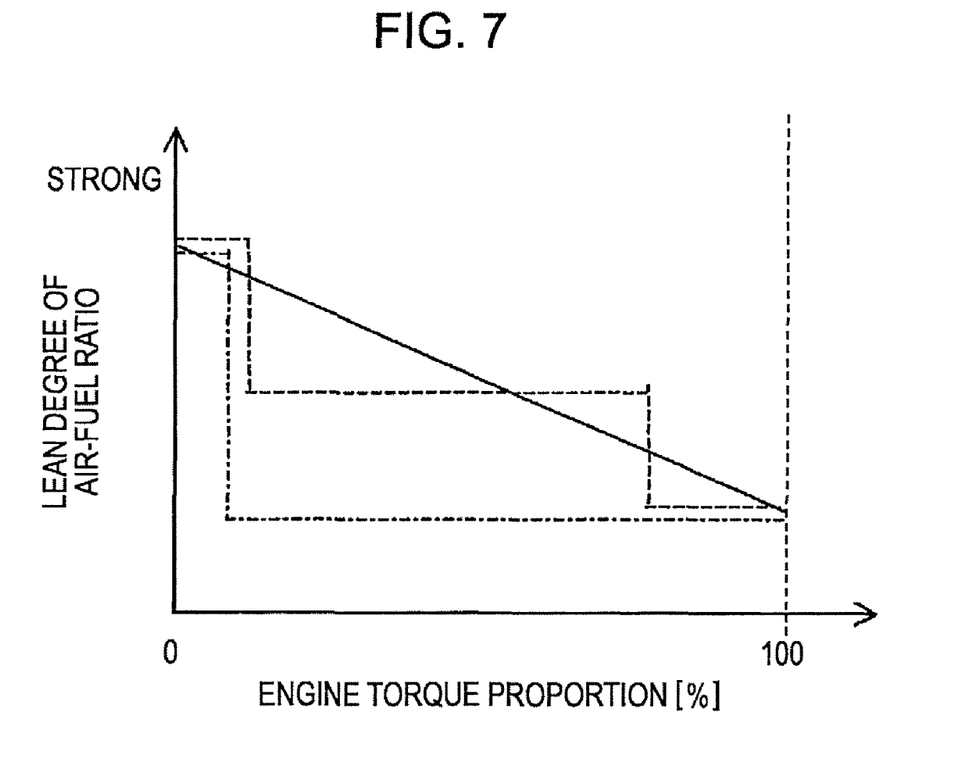
FIG. 7 is a graph showing the relationship between engine torque proportion and lean degree of air-fuel ratio.

In this case, the smaller the engine torque proportion Re the larger these three types of values are set. As a result, when the engine torque proportion is small, each value is set so as to maximally enhance the exhaust performance. Accordingly, it will be seen that it is possible to improve the exhaust performance.

Similar to the allowed-surge-torque-value table, these tables may be such as to vary proportionally to the engine torque proportion Re, vary in steps, or vary only at a particular value of Re.

Control of Distribution of Torque During Cooling

To improve the exhaust performance during cooling, the controller 20 further controls the torque distribution in the manner described herein, as follows.

Figure 8:
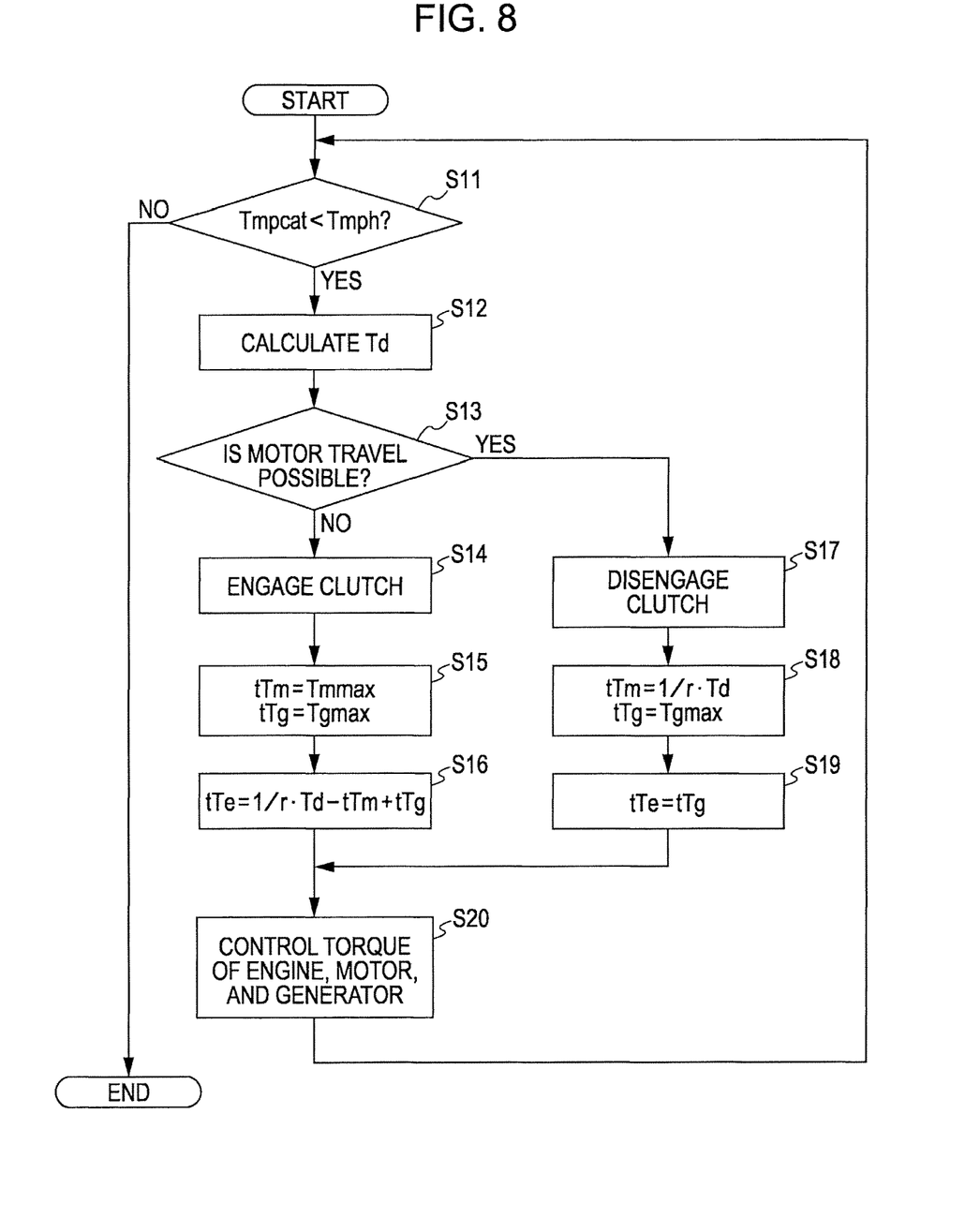
FIG. 8 is a flowchart showing the steps of a torque distribution controlling operation during warm-up period.

FIG. 8 is a flowchart showing the steps of the torque distribution controlling operation that is carried out by the controller 20 when cooling. Referring to FIG. 8, first, in Step S11, a determination is made as to whether or not the temperature Tmpcat of the catalytic converter 13 is less than a predetermined temperature Tmph (such as the activation temperature of the catalytic converter 13). If the temperature Tmpcat is greater than the predetermined temperature Tmph, the process ends because warming-up is completed. Only during cooling when the temperature Tmpcat is less than the predetermined temperature Tmph does the process proceed to Step S12.

Next, in Step S12, on the basis of the accelerator pedal operation amount AP0 and the vehicle speed VSP, a requested driving shaft torque Td, which is a driving shaft torque that is requested by a driver, is calculated with reference to a predetermined map. The larger the accelerator pedal operation amount APO, the larger the value of the requested driving shaft torque Td that is calculated. Similarly, the higher the vehicle speed VSP, the larger the value of the requested driving shaft torque Td that is calculated.

In Step S13, a determination is made as to whether or not motor travel, in which the vehicle travels by only the torque of the motor 2, is possible. Whether or not the motor travel is possible can be determined by determining whether or not the motor 2 can generate the requested driving shaft torque Td as a result of the motor 2 generating a maximum torque Tmmax. More specifically, a determination is made as to whether or not the following Formula (2) is established:

$$Tmmax - 1/r \cdot Td \leq \Delta T \quad (2)$$

where r is a speed reduction ratio from the input shaft of the transmission 3 to the output shaft of the transfer unit 4, and $\Delta T$ is a predetermined value (positive near zero). If the relationship expressed by Formula (2) is established, it is determined that the motor travel is possible, whereas, if it is not established, it is determined that the motor travel is not possible.

If it is determined that the motor travel is not possible, the process proceeds to Step S14 in which, if the clutch 7 is not engaged, the clutch 7 is engaged.

Then, in Step S15, the target torque tTm of the motor 2 and the target torque tTg of the generator 8 are set to the maximum torque Tmmax of the motor 2 and a maximum torque Tgmax of the generator 8, respectively. The maximum torque Tmmax of the motor 2 and the maximum torque Tgmax of the generator 8 are values that are determined on the basis of rated outputs of the motor 2 and the generator 8 and a charging state of a battery (not shown) to which the motor 2 and the generator 8 are connected.

The target torque tTm of the motor 2 is set to the maximum torque Tmmax to reduce the engine torque proportion Re, whereas, the target torque tTg of the generator 8 is set to the maximum torque Tgmax to increase a workload of the engine 1 for providing an exhaust flow rate required for raising the temperature of the catalytic converter 13. As a result, it is possible to quickly raise the temperature of the catalytic converter.

In Step S16, to achieve the requested driving shaft torque Td by the engine 1 generating an amount of torque that cannot be generated by the motor 2, the target torque tTe of the engine 1 is calculated by the following Formula (3):

$$tTe = 1/r \cdot Td - tTm + tTg \quad (3)$$

If it is determined that the motor travel is possible, the process proceeds to Step S17 in which, if the clutch 7 is not disengaged, the clutch 7 is disengaged. Then, in Step S118, the target torque tTm of the motor 2 is set to 1/r·Td, and the target torque tTg of the generator 2 is set to the maximum torque Tgmax. The target torque tTg of the generator 8 is set to the maximum torque Tgmax to, as with Step S15, increase a workload of the engine 1 for providing an exhaust flow rate required for raising the temperature of the catalytic converter 13.

In Step S19, to generate by the engine 1 a sufficient torque for driving the generator 2, the target torque tTe of the engine 1 is set equal to tTg.

In Step S20, the torque of the engine 1, the torque of the engine 2, and the torque of the generator 8 are controlled so that the target torque tTe set in Step S16 or S19 and the target torques tTm and tTg set in Step S15 or S18 are achieved. Then, the process returns to Step S11.

Therefore, during the cooling, the amount of torque that is generated by the engine 1 is restricted by the torque distribution controlling operation, thereby reducing the engine torque proportion Re. Since, as the engine torque proportion Re is reduced, the allowed surge torque value is set to a larger value, it is possible to set the retard amount of the ignition timing to a large value, thereby increasing the rate at which the temperature of the catalytic converter 13 is raised.

Instead of the retard of the ignition time, or in accordance with the retard of the ignition time, the valve overlap amount (or valve lead angle amount) is increased, and the lean degree of the air-fuel ratio is increased. Therefore, it is possible to reduce the amounts of HC and CO exhausted during cooling and to further improve the exhaust performance during the cooling.

Further, in both hybrid travel and motor travel, the torque of the generator 8 is controlled to the maximum torque Tgmax. Therefore, the workload of the engine 1 is increased to increase the exhaust flow rate required for raising the temperature of the catalyst 12. This further accelerates the temperature rise of the catalyst 13, so that the exhaust performance during the cooling can be further improved.

Torque Increase Delay Controlling Operation During Sudden Acceleration

The above-described controlling operations are carried out to improve the exhaust performance of the engine 1 in a range in which the surge torque does not exceed the allowed surge torque value. Therefore, it is possible to increase the exhaust performance while restricting a reduction in the drivability resulting from the surge torque. However, since the engine torque proportion Re is increased abruptly when the vehicle is suddenly accelerated, the influence of the surge torque on the drivability is increased if the surge torque remains large as a result of carrying out the controlling operations. If the deterioration of the vehicle behavior due to the surge torque is to be reliably restricted, this point needs to be considered.

Accordingly, the controller 20 carries out a torque increase delay controlling operation (described below) when it is determined that the vehicle is suddenly accelerated. In the torque increase delay controlling operation, when it is determined that there is a request for sudden acceleration, first, the surge torque of the engine 1 is controlled so that the surge torque is small. Then, after waiting for the surge torque of the engine 1 to become sufficiently small, the torque of the engine 1 is controlled so as to be increased in accordance with the request for sudden acceleration. This torque increase delay controlling operation is performed during hybrid travel in which the clutch 7 is engaged.

Figure 9:
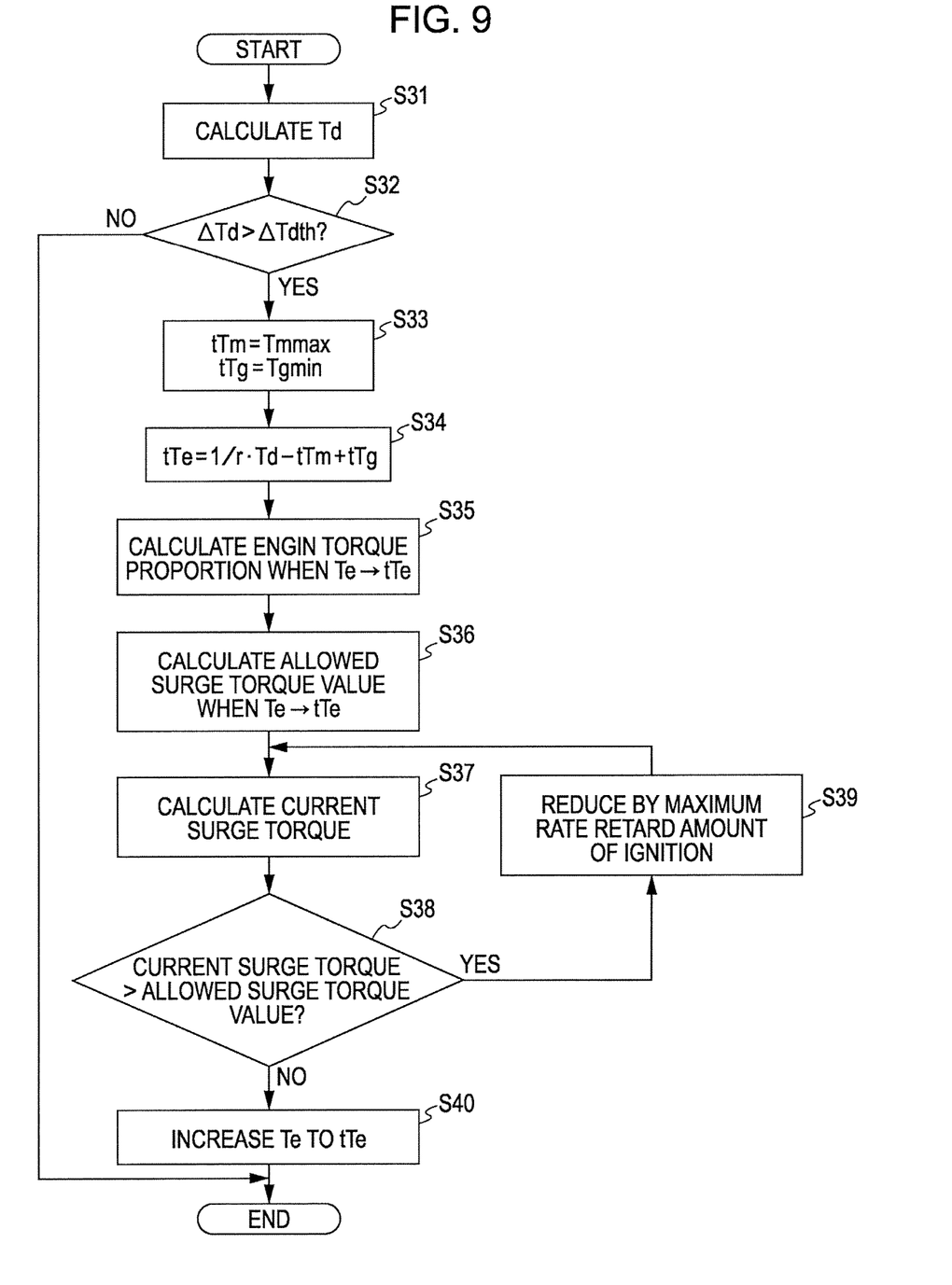
FIG. 9 is a flowchart showing the steps of a torque increase delay controlling operation that is performed when accelerating suddenly.

Referring to FIG. 9, a flowchart showing the steps of the torque increase delay controlling operation that is performed when accelerating suddenly, is shown. The torque increase delay controlling operation that is carried out when accelerating suddenly will be described with reference to FIG. 9. First, in Step S31, on the basis of the accelerator pedal operation amount AP0 and the vehicle speed VSP, the requested driving shaft torque Td, which is requested by a driver, is calculated with reference to a predetermined map.

Next, in Step S32, a change amount ΔTd of the requested driving shaft torque Td is calculated to determine whether or not the change amount ΔTd is greater than a sudden acceleration determination threshold value ΔTdth. If it is determined that the change amount ΔTd is greater than the sudden acceleration determination threshold value ΔTdth, and that there is a demand for sudden acceleration, the process of determining the torque increase delay controlling operation proceeds to Step S33. If not, the process ends. Whether or not there is a request for sudden acceleration may be determined from a change amount of the accelerator pedal operation amount AP0 or changing speed.

In Step S33, the target torque tTm of the motor 2 is set to the maximum torque Tmmax of the motor 2, and the target torque tTg of the generator 8 is set to a minimum torque Tgmin of the generator 8. The maximum torque Tmmax of the motor 2 is a value that is determined by a rated output of the motor 2 and a charging state of a battery (not shown). The minimum torque Tgmin of the generator 8 is a value that is determined by power consumption of the motor 2 and other electrical components and a charging state of a battery (not shown).

The target torque tTm of the motor 2 is set to the maximum torque Tmmax to reduce the engine torque proportion Re for increasing the allowed surge torque value. The target torque tTg of the generator 8 is set to the minimum torque Tgmin to increase combustion stability of the engine 1 by reducing the workload on the engine 1, so that the surge torque is reduced.

In Step S34, to achieve the requested driving shaft torque Td by the engine 1 generating the torque that cannot be generated by the motor 2, the target torque tTe of the engine 1 is calculated by the following Formula (4):

$$tTe = 1/r \cdot Td - tTm + tTg \qquad (4)$$

In Step S35, the engine torque proportion Re for when the engine 1, the motor 2, and the generator 8 are controlled to the target torque values tTe, tTm, and tTg, respectively, is calculated. Then, in Step S36, on the basis of the calculated engine torque proportion Re, the allowed surge torque value is calculated with reference to the graph shown in FIG. 3. The allowed surge torque value that is calculated here is not an allowed surge torque value in correspondence with a current driving state, but an allowed surge torque value that is expected when the engine 1, the motor 2, and the generator 8 are controlled to their respective target torques tTe, tTm, and tTg. That is, the calculated allowed surge torque value is a hypothetical value.

In Step S37, the current surge torque of the engine 1 is calculated. The surge torque can be determined from the rotation variation of the engine 1 or variation in the internal pressure of a tube in the engine 1, as measured by those having ordinary skill in the art.

In Step S38, a determination is made as to whether or not the current surge torque is greater than the allowed surge torque value calculated in Step S36. If the current surge torque is greater than the calculated allowed surge torque value, the process proceeds to Step S39 in which a controlling operation for reducing the surge torque of the engine (hereunder referred to as the "surge torque reduction controlling operation") is carried out.

In the surge torque reduction controlling operation, for example, if the catalytic converter 13 is controlled so that its temperature is raised by increasing the retard amount of the ignition timing, the surge torque of the engine 1 is reduced by reducing the retard amount of the ignition time by a maximum rate. If, to reduce the amounts of HC and CO, the valve overlap amount (or valve lead angle amount) is increased, or the lean degree of the air-fuel ratio is increased, either of these values is reduced to reduce the surge torque of the engine 1.

After the surge torque reduction controlling operation, the process proceeds to Step S37. The surge torque reduction controlling operation of Step S39 is repeated until the surge torque of the engine 1 becomes less than the allowed surge torque value calculated in Step S36.

When the current surge torque becomes less than the allowed surge torque value calculated in Step S36, as a result of carrying out the surge torque reduction controlling operation, the process proceeds to Step S40 in which the actual torque Te of the engine 1 is increased to the target torque tTe.

Figure 10:
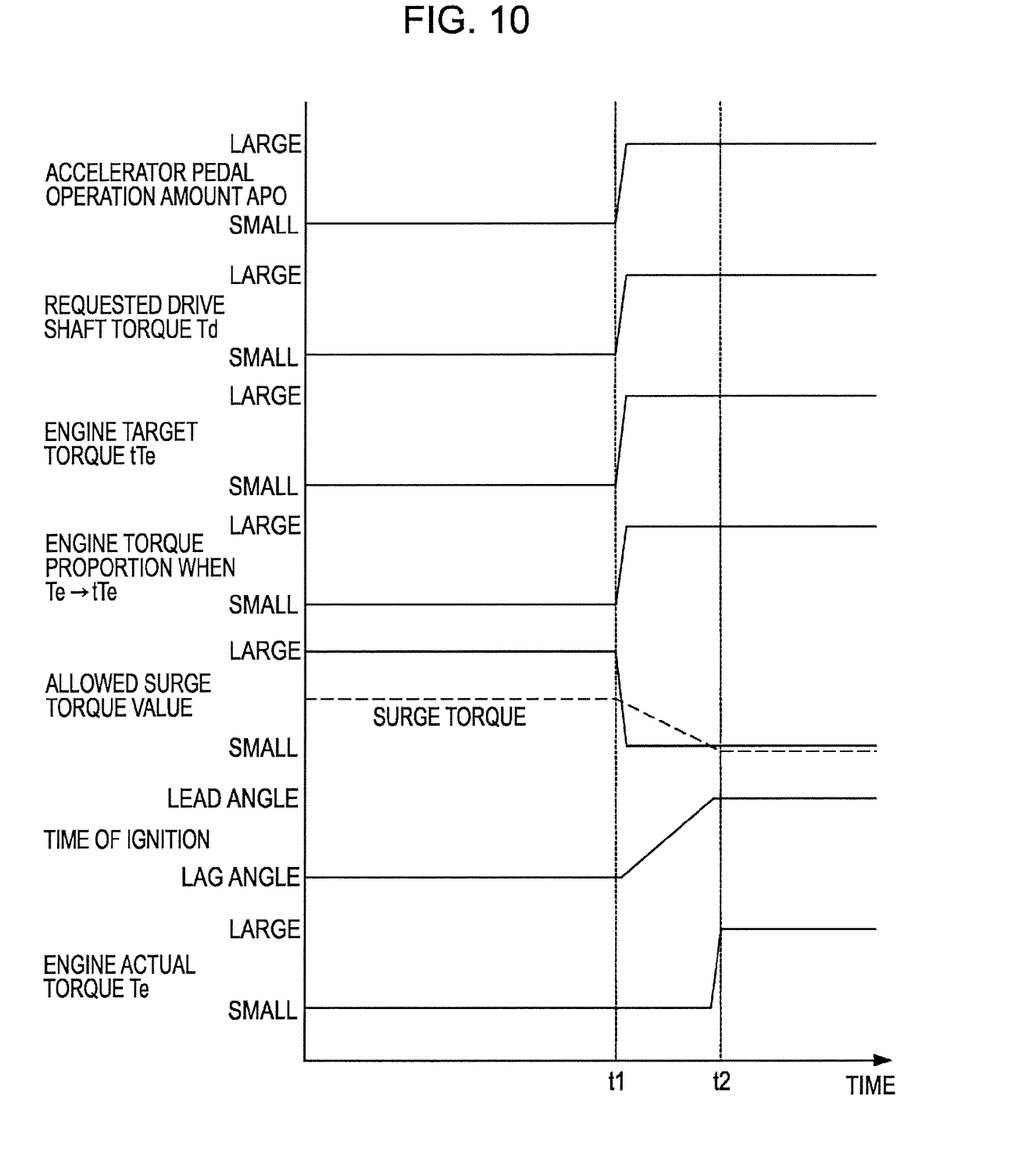
FIG. 10 is a time chart illustrating the performance of the torque increase delay controlling operation when accelerating suddenly.

Referring to FIG. 10, a time chart, illustrating the performance of the torque increase delay controlling operation when accelerating suddenly, is shown. In the present example, the vehicle is suddenly accelerated when the temperature of the catalytic converter 13 is raised by retarding the ignition time of the engine 1 during cooling.

Operational advantages of carrying out the torque increase delay controlling operation with reference to the time chart are discussed, as follows. When an accelerator pedal is depressed suddenly at a time t1, the requested driving shaft torque Td and the target torque tTe of the engine 1 are increased accordingly.

When the torque of the engine 1 is increased, the proportion of the engine torque of the torque that is transmitted to the driving shaft 5 is increased, causing the allowed surge torque value to become smaller. Since the surge torque of the engine 1 goes beyond this value, according to the above-described controlling operation, prior to increasing the torque of the engine 1, the retard amount of the ignition timing of the engine 1 is reduced by the maximum rate. Accordingly, the surge torque of the engine 1 is reduced (surge torque reduction controlling operation).

The surge torque reduction controlling operation is continued until the surge torque becomes less than the allowed surge torque value at a time t2. When the surge torque becomes less than the allowed surge torque value, the actual torque Te of the engine 1 is increased to the target torque tTe.

Therefore, according to the torque increase delay controlling operation, before the torque of the engine 1 is suddenly increased by suddenly accelerating the vehicle, the retard amount of the ignition time is reduced, and the torque of the generator 8 is controlled to the minimum torque Tgmin, so that the workload of the engine 1 is reduced. Consequently, the combustion stability of the engine 1 is increased, thereby sufficiently reducing the surge torque of the engine 1. Thus, by utilizing the method herein explained, it is possible to overcome the problem of the vehicle behavior deteriorating due to the large influence of the surge torque when the vehicle is suddenly accelerated.

In addition, since the torque of the motor 2, after determining that the vehicle has been suddenly accelerated, is controlled to the maximum torque Tmmax, the torque proportion of the engine 1 is made as small as possible, so that it is possible to restrict the reduction of the allowed surge torque value during the sudden acceleration. Therefore, it is possible to minimize, to the extent possible, the reduction in the retard amount of the ignition timing for reducing the surge torque. Thus, by utilizing the method taught herein, it is possible to overcome the problem of the exhaust performance deteriorating due to the reduction of the retard amount of the ignition time.

Although an embodiment of the present invention is described above, the above-described structure is merely one specific structural form of the hybrid vehicle to which the present invention is applied. The scope of application of the present invention is not limited to the above-described structure.

In particular, the structure of the hybrid vehicle is not limited to that shown in FIG. 1. As long as the hybrid vehicle is one in which the torque of the engine and the torque of the motor are transmitted to the driving shaft, the present invention may be widely applied. For example, the present invention may be applied to a hybrid vehicle having a planetary gear mechanism for torque distribution or a hybrid vehicle having a motor-generator including a motor and a generator that are integrated to each other, as will be understood by persons having ordinary skill in the art.

What is claimed is:

1. A control apparatus of a hybrid vehicle having a drive shaft capable of being driven by torque from an engine and a motor, the control apparatus comprising:
a controller programmed to:
calculate an engine torque proportion of a total torque transmitted to a drive shaft from an engine and a motor;
set an allowable surge torque level based on the engine torque proportion with the allowable surge torque level being set to be increased as the engine torque proportion decreases, and operate the engine with at least one parameter such that a surge torque of the engine does not exceed the allowable surge torque level.

2. The control apparatus according to claim 1, wherein the at least one parameter is at least one of an ignition timing, a valve timing and an air-fuel ratio of the engine.

3. The control apparatus according to claim 1, wherein the at least one parameter is adapted to improve an emission performance of the engine in a range where the surge torque of the engine does not exceed the allowable surge torque level.

4. The control apparatus according to claim 1, wherein, when the engine is in a cold operation condition, the at least one parameter is adapted to warm a catalytic converter in a range where the surge torque of the engine not exceeding the allowable surge torque level.

5. The control apparatus according to claim 1, wherein the at least one parameter is an ignition timing of the engine with the ignition timing being adapted to retard in a range where the surge torque of the engine not exceeding the allowable surge torque level.

6. The control apparatus according to claim 1, wherein the at least one parameter is a valve overlap of an intake valve and an exhaust valve with the valve overlap being adapted to increase in a range where the surge torque of the engine not exceeding the allowable surge torque level.

7. The control apparatus according to claim 1, wherein the at least one parameter is an air-fuel ratio of the engine with the air-fuel ratio being adapted to increase in a range where the surge torque of the engine not exceeding the allowable surge torque level.

8. The control apparatus according to claim 2, wherein an amount of change in the at least one parameter is increased as the engine torque proportion decreases.

9. The control apparatus according to claim 1, further comprising a catalytic converter disposed in an exhaust passage of the engine, wherein the motor is operated to output a maximum torque when a temperature of the catalytic converter is lower than a predetermined temperate.

10. The control apparatus according to claim 1, further comprising a generator capable of being driven by the engine to generate electric power with a portion of engine torque, wherein an electric power generation by the generator is maximized when a temperature of the catalytic converter is lower than a predetermined temperate.

11. The control apparatus according to claim 1, further comprising an acceleration request detecting section configured to detect an acceleration request of the hybrid vehicle, wherein an amount of change in the at least one parameter is decreased such that the surge torque of the engine is reduced when the acceleration request is detected, and the engine is operated to increase the engine torque thereafter.

12. A method of controlling a hybrid vehicle having a drive shaft capable of being driven by torque from an engine and a motor, comprising the steps of:
calculating an engine torque proportion of a total torque transmitted to a drive shaft from an engine and a motor;
calculating an allowable surge torque level based on the engine torque proportion with the allowable surge torque level being set to be increased as the engine torque proportion decreases; and
operating the engine with at least one parameter such that the surge torque of the engine does not exceed the allowable surge torque level.

13. The method according to claim 12, wherein the at least one parameter is at least one of an ignition timing, a valve timing and an air-fuel ratio of the engine.

14. The method according to claim 12, wherein the at least one parameter is adapted to improve an emission performance of the engine in a range where the surge torque of the engine does not exceed the allowable surge torque level.

15. The method according to claim 12, wherein, when the engine is in a cold operation condition, the at least one parameter is adapted to warm a catalytic converter in a range where the surge torque of the engine not exceeding the allowable surge torque level.

16. The method according to claim 12, wherein the at least one parameter is an ignition timing of the engine with the ignition timing being adapted to retard in a range where the surge torque of the engine not exceeding the allowable surge torque level.

17. The method according to claim 12, wherein the at least one parameter is a valve overlap of an intake valve and an exhaust valve with the valve overlap being adapted to increase in a range where the surge torque of the engine not exceeding the allowable surge torque level.

18. The method according to claim 12, wherein the at least one parameter is an air-fuel ratio of the engine with the air-fuel ratio being adapted to increase in a range where the surge torque of the engine not exceeding the allowable surge torque level.

19. The method according to claim 13, wherein an amount of change in the at least one parameter is increased as the engine torque proportion decreases.

20. The method according to claim 12, wherein the motor is operated to output a maximum torque when a temperature of a catalytic converter that is disposed in an exhaust passage of the engine is lower than a predetermined temperate.

21. The method according to claim 12, wherein an electric power generation by a generator, capable of being driven by the engine to generate electric power, is maximized when a temperature of the catalytic converter is lower than a predetermined temperate.

22. The method according to claim 12, wherein an amount of change in the at least one parameter is decreased such that the surge torque of the engine is reduced when an acceleration request of the vehicle is detected, and the engine is operated to increase the engine torque thereafter.

\* \* \* \* \*